Figure 1:
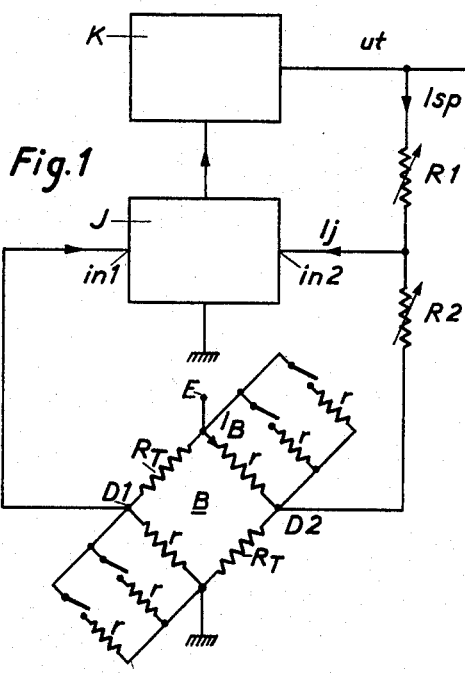

March 24, 1964 E. E. ERIKSSON ETAL 3,126,508
ARRANGEMENT FOR TEMPERATURE DEPENDENT CONTROL
OF THE OUTPUT VOLTAGE OF AN ENERGY SOURCE
Filed Dec. 22, 1960

INVENTORS
ELOF ERIK ERIKSSON
ØYVIND GJESSVÅG
JÖNS KURT ALVAR OLSSON

By Hane and Nydick
ATTORNEYS

United States Patent Office 3,126,508
Patented Mar. 24, 1964

3,126,508
ARRANGEMENT FOR TEMPERATURE DEPENDENT CONTROL OF THE OUTPUT VOLTAGE OF AN ENERGY SOURCE
Elof Erik Eriksson and Øyvind Gjessvåg, Bandhagen, and Jöns Kurt Alvar Olsson, Tullinge, Sweden, assignors to Telefonaktiebolaget L M Ericsson, Stockholm, Sweden, a corporation of Sweden
Filed Dec. 22, 1960, Ser. No. 77,557
Claims priority, application Sweden Nov. 1, 1960
1 Claim. (Cl. 323—69)

The present invention relates to an arrangement for temperature dependent control of the output voltage of an energy source.

It is known for instance to arrange a bridge network including current-, voltage-, or load responsive resistance elements for keeping the output voltage of an energy source constant. These resistance elements are fed with current, which is obtained from the output voltage and are used as control elements in a regulating circuit. When the output voltage has a tendency to decrease, the current through the resistance elements decreases also, the resistances of which thereby decrease (or increase) and influence the regulating circuit so that said tendency is counteracted. Bridge networks with, for instance, current dependent resistance elements are thus known. These bridge networks are generally constructed so that the size of the resistances of the bridge is determined by the magnitude of an impressed external current or voltage. Variations of the room temperature for instance influence the function of the bridge as regulating instrument in an undesirable way. In practice a simple and reliable arrangement is needed which provides a temperature dependent regulation of the output voltage of an energy source with regard to the room temperature existing at the load. As an example certain ferrite cores may be mentioned, the coercive forces of which is strongly temperature dependent. Hence the voltage sources, which feed these ferrite memories, must be given a temperature characteristic which corresponds to the one of the ferrite memories.

The purpose of the present invention is to provide a regulating arrangement which is specially suitable in this respect. The arrangement according to the invention comprises a temperature sensitive bridge and a comparison circuit provided with two inputs, to the one input of which a diagonal point in said bridge is connected and to the other input of which a branch from the output side of the energy source is connected. The arrangement is characterized thereby that part of said branch is included in a voltage divider, the one end of which is connected to a diagonal point in the bridge opposite said diagonal point and that the elements of the comparison circuit, the bridge and the voltage divided are so chosen and dimensioned that the current through the bridge is substantially larger than the current through the voltage divider, which current in its turn is substantially larger than the current through the part of the branch which leads from the voltage divider to the other input on the comparison circuit.

Figure 2:
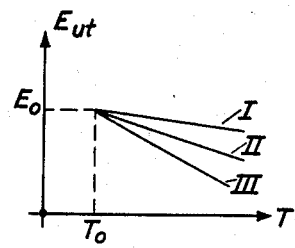
Figure 4:
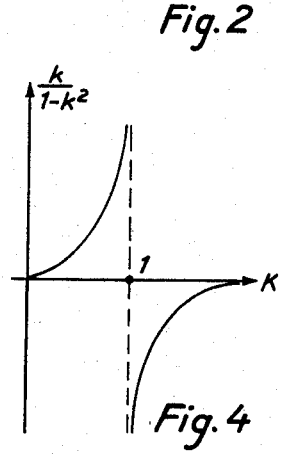
Figure 3:
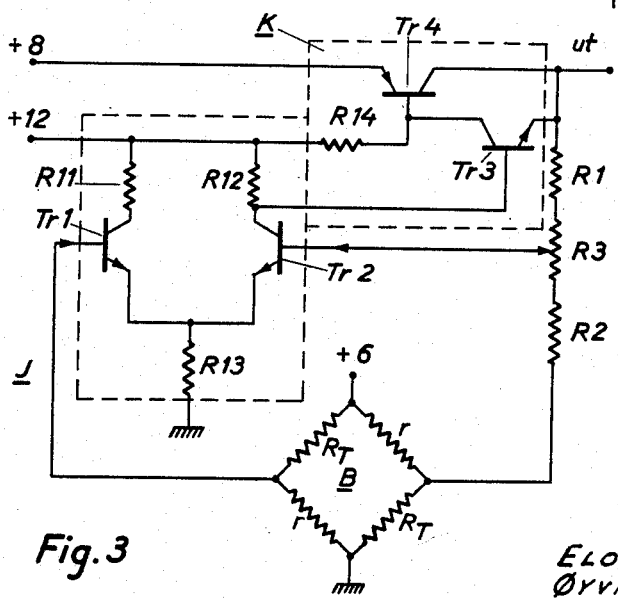

The invention will be further described in connection with the drawing, in which FIG. 1 shows an embodiment according to the invention, FIG. 2 shows voltage-temperature characteristics, FIG. 3 shows the arrangement according to FIG. 1, and FIG. 4 shows a graph of the temperature control obtainable by the arrangement according to FIGS. 1 and 4.

The arrangement according to FIG. 1 comprises an energy source K, the output voltage $E_{ut}$ of which shall be regulated so that it is given any of the temperature characteristics I, II or III, shown in FIG. 2. For the regulation there is a temperature sensitive bridge B, a differential amplifier J working as comparison circuit and a voltage divider R1—R2. The bridge is a four arm bridge and includes in two opposite arms temperature dependent resistances $R_T$ having low thermic resistance ($K < 20°C/W$) and made of for instance enamelled copper wire wound on a frame. The two remaining arms include resistances $r$ which are substantially temperature independent. Either one or several $$\left(\frac{r}{3} > R_T\right)$$

of resistance may be connected in the same arm at the same time depending upon which one of the characteristics I, II or III it is desired to obtain at the output. One of two opposite diagonal points is grounded and the other is connected to the voltage source E, the voltage of which must be as temperature stable as possible. Of the remaining two diagonal points of the bridge, one, D1, is connected to an input $in1$ on the comparison circuit T while the other diagonal point, D2, is connected to one end of the voltage divider R1—R2.

The comparison circuit J has two inputs, one of which, namely $in1$, connected to D1 as already mentioned and the remaining input, $in2$, is connected to the output side $ut$ of the energy source K through a branch $in2$—R1—$ut$. A part of said branch, namely R1, is an integral part of the earlier mentioned voltage divider R1—R2, which consists of two series connected resistances, R1—R2. In order to give the output the same value $E_o$ at the temperature T for the three cases I, II and III earlier mentioned, the relation R1/R2 must be correspondingly changed as resistances $r$ are connected. Because of this the resistances R1 and R2 are shown as being variable.

The elements included in the comparison circuit J, the bridge B and the voltage divider R1—R2 are so chosen and dimensioned, that during operation the current $I_B$ through the bridge B is substantially larger than the current $I_{sp}$ through the voltage divider, which current ($I_{sp}$) in its turn is substantially larger than the current $I_j$ through the part of the branch $ut$—R1—$in2$, which leads from the voltage divider R1—R2 to the other input $in2$ on the comparison circuit J.

The arrangement now described functions in brief as follows: In respect to the voltage the two inputs $in1$ and $in2$ of the differential amplifier (comparison circuit) J follow each other very exactly, and therefore the voltage between the diagonal points D1 and D2 also will be found across the resistance R2 and thereby control the current by means of this resistance. As the differential amplifier J charges the voltage divider R1—R2 inconsiderably the mentioned voltage between the diagonal points D1 and D2 will evidently control the current through the resistance R1. The temperature characteristic $\alpha$ of the output voltage $E_{ut}$ will then have the functional relation:

$$\alpha = \alpha_1 \frac{E_{ut} - E_2}{E_{ut}} + \alpha_{E_2} \cdot \frac{E_2}{E_{ut}}$$

where $$\alpha_1 = \frac{dV1}{dT} \cdot \frac{1}{V1}$$

and V1 is the potential difference between D1 and D2, $E_2$ is the potential in the point D2, and $$\alpha_{E_2} = \frac{dE_2}{dT} \cdot \frac{1}{E_2}$$

If the symbol $$K = \frac{r}{R_{T_o}}$$

where $R_{T_o}$ is the value of the resistance $R_T$ at $T=0$ is inserted and so the symbol $\alpha_{cu}$ for the temperature characteristic of the copper resistance $R_T$, the following value on the temperature characteristic $\alpha$ of the output voltage $E_{ut}$ is obtained:

$$\alpha = \alpha_{ou} \cdot \left(2 - \frac{E}{E_{ut}}\right) \cdot \frac{K}{1-K^2}$$

As appears from the coefficient $$\frac{K}{1-K^2}$$

which is shown in FIG. 4, $\alpha$ can consequently be varied within wide limits by varying the relation $$\frac{r}{R_{To}}$$

that is the arrangement according to the invention produces an output voltage, which is carefully temperature regulated within practically satisfactory limits.

In the arrangement according to FIG. 3 the comparison circuit J comprises two transistors $Tr1$ and $Tr2$, the emitters of which are grounded through a common resistance R13 and the collectors of which are connected to the voltage $+12$ volt through resistances R11 resp. R12. The base of the transistor $Tr1$ is connected to the one diagonal point of the bridge B and the base of the transistor $Tr2$ is connected to the diagonal point in the bridge opposite said diagonal point through a part of a regulating resistance R3 and a resistance R2. The energy source K, the output voltage of which shall be regulated, comprises two transistors $Tr3$ and $Tr4$. The base of the transistor $Tr3$ is connected to the collector of the transistor $Tr2$, the collector of the transistor $Tr3$ is connected to the base of the transistor $Tr4$ and through a resistance R14 to the voltage $+12$ volt and the emitter of the transistor $Tr3$ is connected to the output $ut$ of the energy source K. The emitter of the transistor $Tr4$ is connected to the voltage $+8$ volt and its collector is connected to the output $ut$.

The following values and type notations may be given as an example of choice of the included elements:

| | |
|---|---|
| $R_T = 150\Omega$ vid $20°$ C. | $R13 = 820\Omega$ |
| $r = 210\Omega$ | $Tr4$ type OC35 |
| $Tr1$, $Tr2$ and $Tr3$ type 2N214 | $R14 = 1.2\Omega$ |
| | $R1 = 3.3 K\Omega$ |
| $R11 = R12 = 2.2 K\Omega$ | $R3 = 1 K\Omega$ |
| $R2 = 1.5 K\Omega$ | |

With the transistors and resistances so chosen, a current $I_{sp}$ of ca. 0.6 ma. in the voltage divider R1—R3—R2 is obtained at a nominal output voltage $E_{ut} = 6$ volts and an output current $= 300$ ma. at ca. $20°$ C., while the current $I_B$ through a bridge branch is ca. 17 ma. and the current $I_j$ to the base of the transistor $Tr2$ is ca 0.05 ma.

The operation of the system of FIG. 3 is evident from the detailed description of FIG. 1.

We claim:

A circuit system for controlling the output voltage of a source of energy in accordance with temperature, said circuit system comprising, in combination, a four-arm bridge having a first, a second, a third and a fourth diagonal point, said bridge including temperature-responsive impedance means in two opposite arms defined by the first and the second point and the third and the fourth point respectively of the bridge, a source of current connected to the first and the third point, comparison circuit means connectable to a source of power and having two inputs, one of said inputs being connected to the second point of the bridge and the other input being connected to the output of said source of energy, and a variable voltage divider having a variable first part included in the connection between said other input of the comparison circuit means and the output of the source of energy and a variable second part connected between said other input and the fourth point of the bridge, said comparison circuit means, said bridge and said voltage divider being correlated so that the current across the bridge is substantially higher than the current across the voltage divider and the current across the voltage divider is substantially higher than the current through the connection leading from said first part of the voltage divider to said other input of the comparison circuit means.

References Cited in the file of this patent

UNITED STATES PATENTS

| | | |
|---|---|---|
| 2,825,867 | Kabak | Mar. 4, 1958 |
| 2,912,638 | McNamee | Nov. 10, 1959 |